No. 791,069. PATENTED MAY 30, 1905.
C. BAKROW.
COMBINED FOLDING BED AND CRADLE.
APPLICATION FILED NOV. 14, 1904.
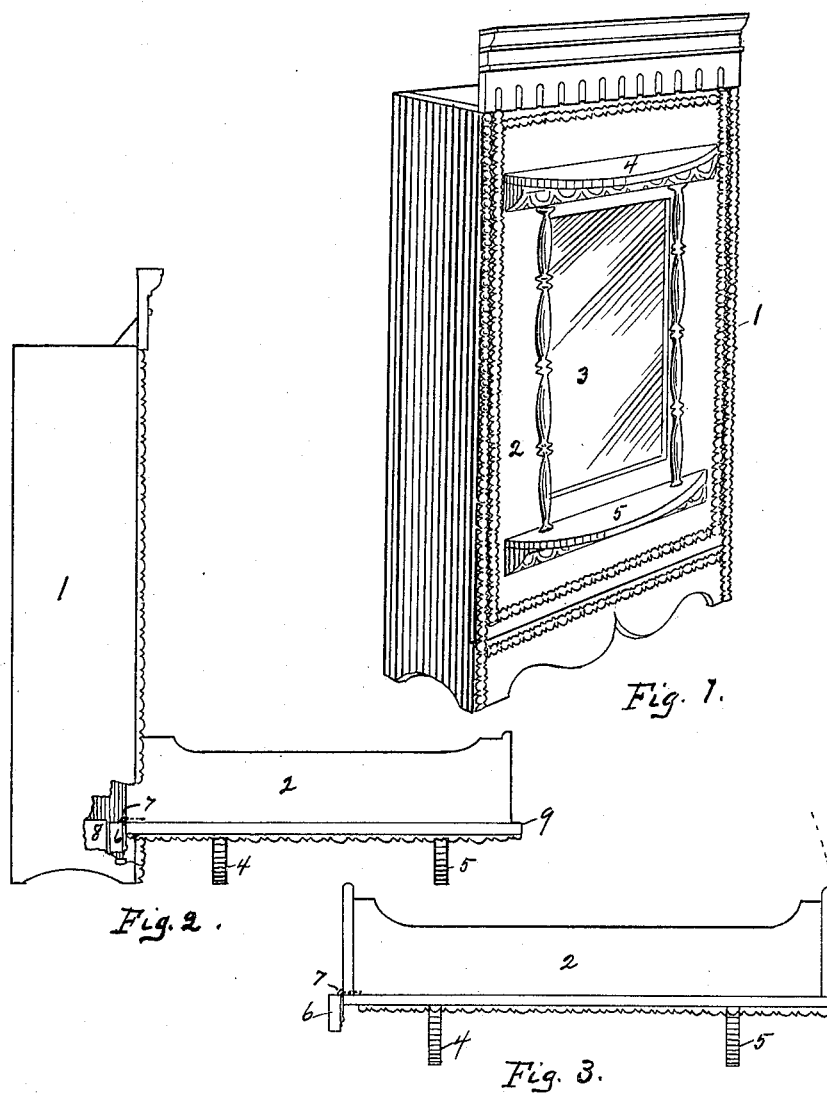
WITNESSES
Stella C. Norris.
J. Henry Brady
INVENTOR
Charles Bakrow.
By Abraham Knobel.
ATTORNEY No. 791,069. Patented May 30, 1905.

UNITED STATES PATENT OFFICE.

CHARLES BAKROW, OF LOUISVILLE, KENTUCKY.

COMBINED FOLDING BED AND CRADLE.

SPECIFICATION forming part of Letters Patent No. 791,069, dated May 30, 1905.

Application filed November 14, 1904. Serial No. 232,656.

*To all whom it may concern:*

Be it known that I, CHARLES BAKROW, a citizen of the United States, residing at Louisville, in the county of Jefferson and State of Kentucky, have invented a new and useful Combined Folding Bed and Cradle, of which the following is a specification.

My invention relates to folding beds; and the objects of my improvement are simplicity of construction, cheapness of manufacture, to provide a folding bed that may be used as a cradle, and especially to provide a bed of this class that is adapted to be manufactured and used as a toy. These objects I attain by means of the device illustrated in the accompanying drawings, in which—

Figure 1 is a perspective view; Fig. 2, a side elevation with part broken away, and Fig. 3 a side elevation of the device when detached from the case for use as a cradle.

Similar reference-numerals refer to similar parts throughout the several views of the drawings.

The case 1 and the bed and cradle 2 constitute the body of the invention. The bottom of the bed portion 2 forms the front face when the bed is folded up. This front face is provided with a mirror 3, disposed centrally, and an upper shelf 4 above mirror 3, and a lower shelf 5 below mirror 3. The shelf 5 is used as a dresser-shelf, and the shelf 4 may be used for ornaments or as a mantel. These shelves 4 and 5 have a circular outer edge, so as to adapt them to form the rockers of the cradle when the bed or cradle is folded down for use. The bed portion 2 is hinged to the case 1 detachably by means of a board or bar 6, which extends across the lower part of the head of the bed and is hinged to the head of the bed by means of hinges 7. In the lower portion of case 1 a block 8 is provided, the forward end of which extends into proximity with the front base portion of case 1, but leaves a notch or socket between said front base portion and itself, adapted to receive the bar 6. When the bed portion 2 is folded down and left attached to the case 1, it may be used as a bed and remains stable; but when it is intended to be used as a cradle the head end is lifted up, so as to draw bar 6 out of its sockets, and the portion 2 may then be removed and set to one side clear of case 1. The bottom of the bed portion 2 extends somewhat beyond the footboard, as shown at 9, in order that the top of the footboard may pass the upper edge of the opening in case 1 and yet the portion 9 may entirely close the opening.

Having thus described my invention, so that any one skilled in the art pertaining thereto may fully understand its construction and use, what I claim as new, and desire to secure by Letters Patent, is—

1. In a folding bed, the combination of a case, a bed portion, means for detachably hinging said bed portion to said case, a mirror centrally disposed on the bottom of said bed portion, a dresser-shelf disposed below said mirror and a mantel-shelf disposed above said mirror in such a manner as to form the legs or means for supporting said bed portion when folded down for use as a bed, substantially as specified.

2. In a folding bed, the combination of a case, a bed portion detachably hinged to said case, an upper and a lower shelf formed with curved edges so as to adapt said shelves to serve as rockers and adapt said bed portion as a cradle when it is folded down for use, substantially as specified.

CHARLES BAKROW.

Witnesses:
 GEO. H. TEPE,
 A. KNOBEL.